United States Patent [19]

Edwards

[11] 4,243,850
[45] Jan. 6, 1981

[54] APPARATUS FOR TRACKING A RECORD TRACK ON A VIDEO DISC

[75] Inventor: Evan A. Edwards, Rochester, N.Y.

[73] Assignee: Eastman Kodak Company, Rochester, N.Y.

[21] Appl. No.: 10,104

[22] Filed: Feb. 7, 1979

[51] Int. Cl.³ ............................................ G11B 21/10
[52] U.S. Cl. ........................................ 369/46; 360/77; 250/202; 369/109
[58] Field of Search .............. 360/77; 358/128, 128.5, 358/128.6; 179/100.3 V, 100.3 B, 100.3 M, 100.1 G; 250/202; 318/576, 577

[56] References Cited

U.S. PATENT DOCUMENTS

| | | | |
|---|---|---|---|
| 3,530,258 | 9/1970 | Gregg et al. | 358/128 |
| 3,876,842 | 4/1975 | Bouwhuis | 179/100.3 V |
| 3,932,700 | 1/1976 | Snopko | 179/100.3 V |
| 3,971,002 | 7/1976 | Bricot et al. | 179/100.3 V |
| 4,001,494 | 1/1977 | Adler et al. | 358/128 X |
| 4,011,400 | 3/1977 | Simons et al. | 358/128 X |
| 4,037,252 | 7/1977 | Janssen | 358/128 |

Primary Examiner—Raymond F. Cardillo, Jr.
Assistant Examiner—Donald McElheny, Jr.
Attorney, Agent, or Firm—Donald W. Strickland

[57] ABSTRACT

In accordance with a presently preferred embodiment of the invention, a source of radiation produces a pair of tracking spots focussed on a record carrier and nominally disposed toward opposite sides of a record track on the record carrier. After interaction with the record carrier, each of the tracking spots is detected to produce respective tracking signals. The components of each tracking signal which correspond to the information signal recorded on the record track are compared and a tracking error signal is produced based upon such comparison. By so producing the tracking error signal, proper tracking can be maintained irrespective of the polarity of the record carrier.

4 Claims, 13 Drawing Figures

POSITIVE POLARITY

NEGATIVE POLARITY

PRIOR ART CONTROL SIGNALS

APPARATUS FOR TRACKING A RECORD TRACK ON A VIDEO DISC

BACKGROUND OF THE INVENTION

1. Field of the Invention

The present invention relates to apparatus for use in maintaining proper tracking of a record track on a record carrier and, more particularly, to such apparatus suitable for use with record carriers of different polarity.

2. Description Relative to the Prior Art

A typical video disc is 30 cm in diameter and has information recorded thereon in the form of optical structure (micron sized pits, bumps, apertures, etc.) along a generally circular or spiral record track. The width of the record track, and the spacing between adjacent record tracks, can be less than a micron. One difficulty encountered in the playback of such a record carrier is maintaining proper tracking of a read spot on the record track. Because of disc eccentricity, wobble, etc., during the recording process, the record track may not possess a perfectly circular or spiral configuration. Thus, the position of the read spot is constantly monitored and adjusted to maintain proper tracking of the read spot on the record track.

U.S. Pat. No. 3,876,842 discloses apparatus for reading a record carrier, such as a video disc, on which information is stored in the form of optical structure along a record track. Three spots of radiation are projected onto the record carrier. One of the spots is nominally positioned on the record carrier to interact with the record track and is used for playback of the recorded information. The other two spots "straddle" the record track and provide tracking error signals. Specifically, the tracking spots partially overlap opposite sides of the record track. During playback, the tracking spots are detected by respective photodetectors after interaction with the record carrier, thus producing a pair of tracking signals. According to that disclosure, a tracking error signal is derived by comparing the average amplitudes of the two tracking signals, perfect tracking being indicated by equal amplitudes. An off-track condition is indicated by one tracking signal having an average amplitude greater than the other, in which case a tracking error signal is produced which adjusts the scanning optics to restore proper tracking.

For reasons which are discussed in detail below, such a tracking system can be made to perform satisfactorily with either a "positive" polarity video disc or a "negative" polarity video disc, but cannot be used interchangeably with discs of different polarity. If all video discs were of the same polarity, there would be no problem. But because of the different approaches taken by video disc manufacturers, the different requirements of video disc recordings, and the lack of standardization in the video disc technology regarding disc polarity, video discs of both polarities are produced. A highly desirable improvement, therefore, would be a tracking system which can interchangeably accept video discs of opposite polarity, while still providing proper tracking.

SUMMARY OF THE INVENTION

The present invention provides apparatus for use in maintaining proper tracking of a record track on a record carrier, irrespective of the polarity of the record carrier. Unlike the tracking system described in U.S. Pat. No. 3,876,842 wherein the average amplitudes of a pair of tracking signals are compared, the present invention uses only a selected component of each tracking signal for comparison and produces a tracking error signal therefrom.

In accordance with a presently preferred embodiment, a source of radiation produces a pair of tracking spots focussed on the record carrier and nominally disposed toward opposite sides of the record track. Each of the tracking spots is detected after interaction with the record carrier and a tracking signal is produced indicative of such interaction. The components of the tracking signals which correspond to the track information signal recorded on the record track are isolated and compared. A tracking error signal is produced based upon such comparison. The component of each tracking signal used for comparison may be the entire track information signal, or any part thereof, such as a carrier wave if the information is so encoded. A convenient method of separating this component from the tracking signal is by means of a filter or capacitor which blocks the low frequency or DC component of the tracking signal and passes only the component corresponding to the track information signal.

BRIEF DESCRIPTION OF THE DRAWINGS

In the detailed description of the preferred embodiments of the invention presented below, reference is made to the accompanying drawings, in which.

DETAILED DESCRIPTION OF THE DRAWINGS

In general, a video disc comprises a substrate, typically 30 cm in diameter, and an image layer which contains the video information. In an optical video disc, the information is recorded in the form of optical structure such as pits, bumps, transparent apertures, opaque areas, etc. Such optical structure is microscopically small. It is not uncommon for individual data bits to be less than a micron in size. The video information is recorded along record tracks on the disc, which tracks may be in the form of concentric circular rings, or a convoluted spiral track. It will be apparent from the description which follows that the present invention is useful with record carriers in general, and that its application is not limited to a video disc.

In order to squeeze as much information as possible on a record carrier, the record tracks and the spacings therebetween are usually quite small. It is not uncommon to encounter record carriers which have track widths and spacings on the order of a micron. The use of such microscopic record tracks provides a high packing density of information, but makes playback of recorded information a precision task. Optical playback of a record carrier such as a video disc is generally accomplished by focussing a read spot on the disc image layer. The diameter of the read spot roughly corresponds to the width of the record track and, under perfect tracking conditions, is usually centered on the record track.

Keeping the read spot centered on the record track requires constant monitoring and adjustment of the read spot position relative to the record track. Factors which make tracking difficult include disc eccentricity and wobble, both during the recording and the playback processes.

Figure 1:
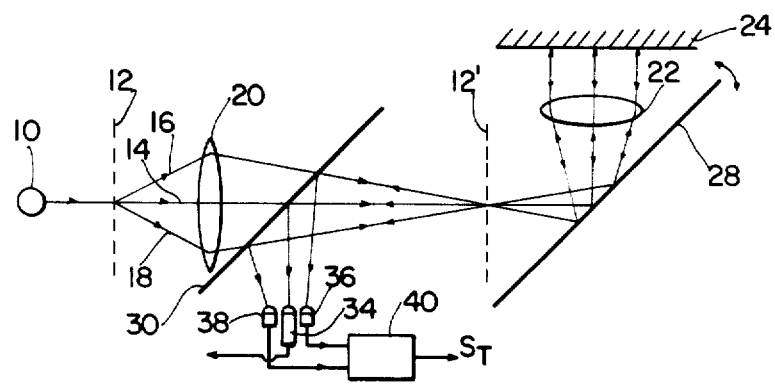
FIG. 1 shows an optical set-up and associated electrical circuitry of a known tracking system.
Figure 2:
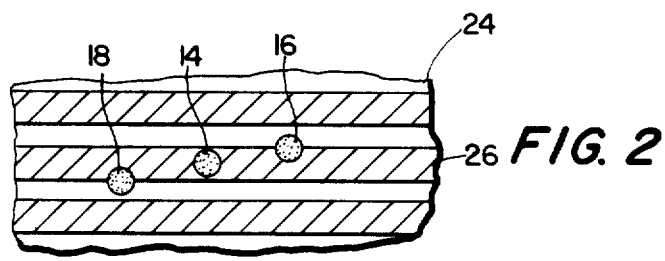
FIGS. 2, 3a, 3b, 3c, 4a, 4b and 4c are used to illustrate the operation of the tracking system shown in FIG. 1.

FIG. 1 shows a known tracking system. A beam of radiation from a source 10 impinges upon a phase grating 12. The phase grating 12 diffracts the beam into several diffraction orders, including a zero order beam 14 and two first order beams 16 and 18. A lens 20 forms an image 12' of the phase grating 12 in the focal plane of a lens 22. The lens 22 therefore converges the three beams 14, 16, 18 into three spots on a record carrier 24. The actual position of the spots 14, 16, 18 on the record carrier 24 are as shown in FIG. 2. It is assumed that the record carrier 24 is of the reflective type and has information recorded thereon along a series of tracks one of which is numbered 26 (for purposes of simplification, the optical structure of the track 26 is not shown in FIG. 2). The read spots 14, 16, 18 are reflected from the record carrier 24 and imaged by the lens 22, via a tiltable mirror 28 and a beam splitter 30, onto three photodetectors 34, 36, 38 respectively. The detector 34 is a high frequency detector which produces an output signal corresponding to the information recorded on the record carrier 24, as seen by the read spot 14. To obtain the highest signal to noise ratio it is desirable that the read spot 14 remain centered on the record track 26 during playback. The spots 16, 18 are tracking spots from which a tracking error signal $S_T$ is derived that adjusts the angular position of the mirror 28 to maintain proper tracking of the read spot 14 on the record track 26.

Figure 3A:
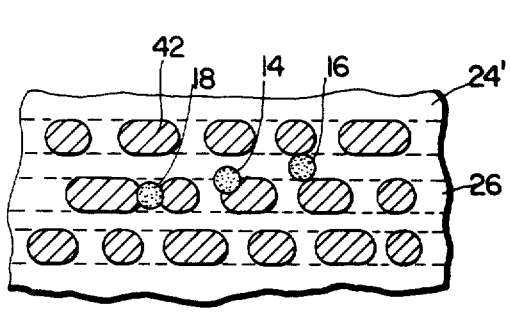
Figure 4A:
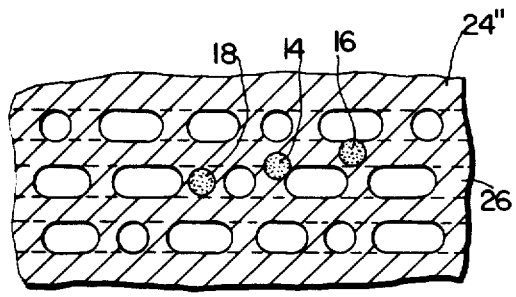
Figure 3B:
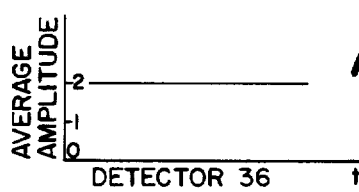
Figure 3C:
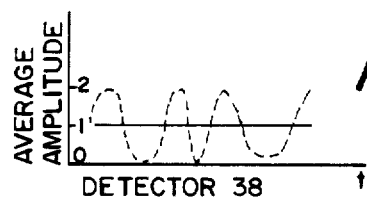

The tracking error signal $S_T$ results from comparing the average amplitudes of tracking signals produced by the detectors 36, 38. An electronic circuit 40, which may include a differential amplifier, is provided for this purpose. FIGS. 3a, 3b and 3c illustrate the derivation of the tracking error signal $S_T$ for a video disc of "positive polarity." At this point it is necessary to define what is meant by the "polarity" of a disc, such as a video disc; and what is meant by the terms "positive" and "negative" polarity. Discs come in two polarities. For example, a disc of one polarity is comprised of an opaque image layer having information recorded therein in the form of discrete windows or apertures. A disc of the opposite polarity has a transparent image layer with information recorded therein in the form of discrete, but opaque, image areas. There does not appear to be a standard convention for referring to one type of disc as having a positive polarity and the other type of disc as having a negative polarity. Throughout the specification and the accompanying claims, it is to be understood that the term positive polarity refers to a record carrier having the polarity shown in FIG. 3a, i.e., an image layer which is generally transparent having information recorded therein in the form of discrete areas which attenuate radiation. Such radiation attenuating areas may, for example, be areas of higher density than the surrounding image layer, or may be pits or bumps which scatter radiation, thereby reducing its intensity. The term negative polarity disc is used to refer to a disc having a polarity as shown in FIG. 4a, wherein the image area is generally opaque (radiation attenuating) and information is recorded therein in the form of discrete windows or apertures. It will be apparent that the above definitions of positive polarity and negative polarity are not affected by whether the disc is of the transmissive type or of the reflective type.

FIG. 3a shows a condition of imperfect tracking on a positive polarity disc 24'. The read spot 14 is no longer centered on the record track 26. If the read spot 14 scans the record track 26 in such a position, the amplitude of the recovered signal (as detected by detector 34) will be significantly reduced, thereby lowering the signal-to-noise ratio of the recovered signal. In the tracking position indicated in FIG. 3a, the tracking spot 16 lies directly between adjacent record tracks 26. Because the record carrier 24' is of positive polarity, the intensity of the tracking spot 16 as seen by the detector 36 will be a maximum. The output signal from the detector 36 thus has a relatively large and constant average amplitude arbitrarily choen to be 2 units; see FIG. 3b. The tracking spot 18 is centered on the record track 26. The detector 38 thus sees a tracking spot 18 modulated in intensity by radiation attenuating areas (refer to the dotted lines in FIG. 3c), one of which is numbered, 42. The average amplitude of the signal from detector 38 will, therefore, be somewhat less than 2 units (i.e., the average amplitude of the signal from the detector 36), and is shown in FIG. 3c as being equal to 1 unit.

To develop an error signal $S_T$ which is indicative of the off-track condition shown in FIG. 3a, the average amplitudes of the tracking signals from the detectors 36, 38 are compared in an electrical circuit 40. The magnitude of the error signal $S_T$ varies directly with the difference in amplitude of the detector 36, 38 tracking signals. Further, the sign of the error signal $S_T$ is chosen to be positive when the average amplitude of the tracking signal from detector 36 is greater than the average amplitude of the tracking signal from the detector 38 (i.e., the condition shown in FIGS. 3b and 3c). When the average amplitude of the tracking signal from the detector 38 exceeds that of the tracking signal from the detector 36, the error signal $S_T$ goes negative (such as would occur, for example, if the read spot 14 were off-centered such that the spot 18 was between record tracks 26 and spot 16 was centered on a track 26). The error signal $S_T$ causes the tilt of the mirror 28 to be adjusted so that the read spot 14 assumes the proper tracking position shown in FIG. 2.

Figure 4B:
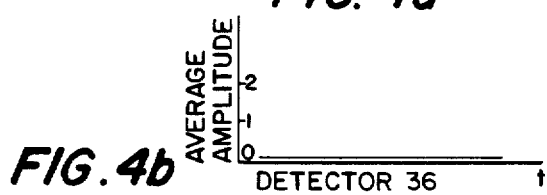
Figure 4C:
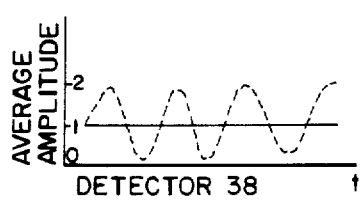

FIG. 4a illustrates the same off-track condition shown in FIG. 3a for a negative polarity disc 24". The prior art system shown in FIG. 1 will no longer provide proper tracking but, rather, will attempt to make a tracking correction in the wrong direction, i.e., the error signal $S_T$ will cause the mirror 28 to tilt in such a manner as to produce an even greater tracking error. As shown in FIG. 4a, the tracking spot 16 lies directly between adjacent record tracks 26. Because the disc 24" is of negative polarity, the detector 36 sees an attenuated tracking spot 16. The signal output from the detector 36 will thus be of a relatively low average amplitude as shown in FIG. 4b. The tracking spot 18 is centered on the record track 26 and is modulated in intensity thereby (as shown by the dotted lines in FIG. 4c). The output of the detector 38 thus has an average amplitude which will be greater than that of the tracking signal from the detector 36. The average amplitude of the tracking signal from the detector 38 is shown as equal to 1 unit in FIG. 4c. The resultant error tracking signal $S_T$ will be negative, therefore, because the average amplitude of the tracking signal from the detector 36 is less than the average amplitude of the tracking signal from the detector 38. But since it has already been assumed that a positive error signal $S_T$ tilts the mirror 28 in a direction to restore proper tracking, a negative error signal $S_T$ will tilt the mirror in the opposite direction and make the off-track condition even worse. To summarize, the tracking system shown in FIG. 1 can be set up to properly track a record carrier of one polarity, but when used with a record carrier of the opposite polarity it fails to provide proper tracking.

Figure 5:
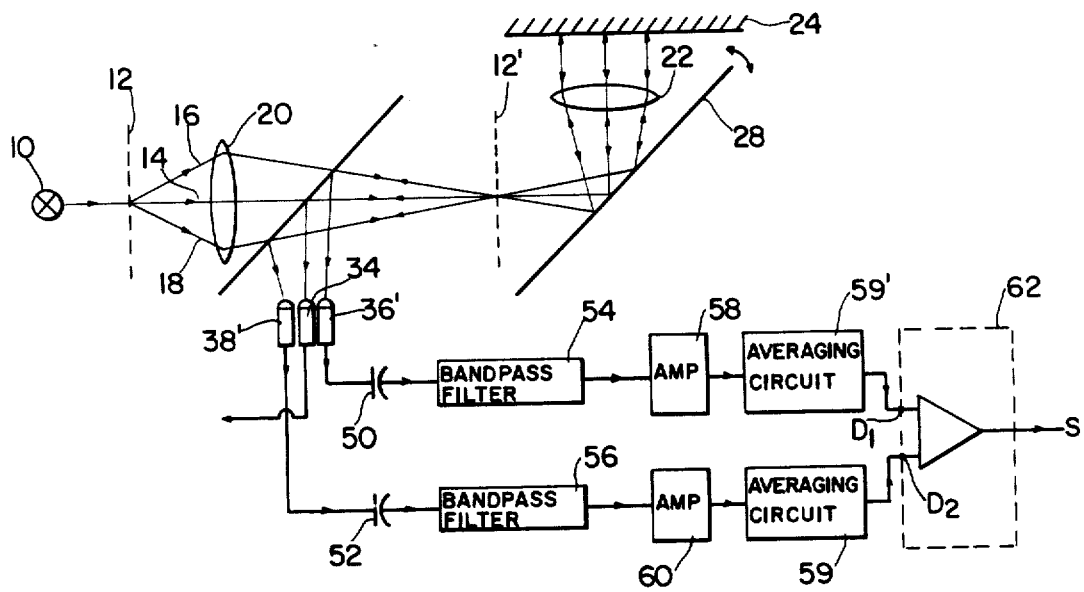
FIG. 5 shows an optical set-up and associated electrical circuitry of a tracking system in accordance with the present invention.
Figure 7A:
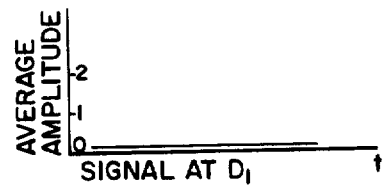

The present invention provides a tracking system that properly tracks record carriers of both polarities. A record carrier player in accordance with the present invention, therefore, can be used to play back both types of video discs. As shown in FIG. 5, the optical portion of the tracking system is identical to that of the prior art system shown in FIG. 1. Although it will be apparent that the optical set-up shown in FIG. 5 (and FIG. 1) is not the only optical arrangement useful in practicing the present invention, it is described in connection with FIG. 5 to point out that the present invention provides a tracking system which tracks both positive and negative polarity record carriers, yet does not necessarily require any modification to the optical system of an existing record carrier player.

The detectors 36′, 38′ shown in FIG. 5 are shown somewhat larger than the detectors 36, 38 of FIG. 1. This is done to emphasize the fact that the detectors 36′, 38′ should be capable of detecting relatively high frequency variations in the amplitude of the tracking spots 16, 18 respectively. (Since the operation of the tracking system described in connection with FIG. 1 depended only upon the average amplitudes of the complete tracking signals from the detectors 36 and 38, it was only necessary to employ detectors 36, 38 sensitive to the average amplitude of the light intensities falling thereon.) Each detector 36′, 38′ senses the intensity of a reflected tracking spot 16, 18 respectively. The intensity of each tracking spot 16, 18 is modulated by the record carrier 24. Such modulation may produce a low frequency or dc component, as in the case of the tracking spot 16 condition shown in FIGS. 3a and 4a, or a high frequency component as in the case of the tracking spot 18 condition, which spot 18 is modulated by the track information signal. In general operation, both of the tracking spots 16, 18 may overlap the record track 16 with the result that each tracking spot 16, 18 is modulated by both a low frequency component and a high frequency component, the latter component corresponding to the track information signal.

Referring to FIG. 5, the modulated tracking spots 16, 18 are detected by a pair of photodetectors 36′, 38′. Each photodetector 36′, 38′ produces a tracking signal which is applied to a respective capacitor 50, 52. This capacitance coupling eliminates any dc component from the tracking signals. Each tracking signal then passes through a bandpass filter (54, 56) and then through an amplifier (58, 60). The bandpass filters 54, 56 block passage of the tracking signals except for a selected alternating component. The selected components of the tracking signals, after amplification and averaging (described in detail below), are passed to a processing circuit 62 in which their average amplitudes are compared and a tracking error signal is produced based upon such comparison. The component of each tracking signal which is selected for comparison can be the information signal or any portion thereof. For example, the error signals may be derived based upon a comparison of the average amplitudes of components of the tracking signals that correspond to a selected frequency range of the track information signal. In the case where the track information signal is an FM encoded signal, this selected frequency range may be chosen to include the FM carrier. In certain applications, it may be desirable to select some other frequency range within the track information signal. Alternatively, the entire frequency range of the track information signal may be used to determine the tracking error signal S.

Figure 6A:
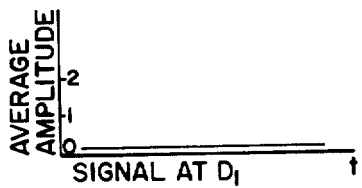
FIGS. 6a, 6b, and 7a, 7b are useful in illustrating the operation of the tracking system shown in FIG. 5.
Figure 6B:
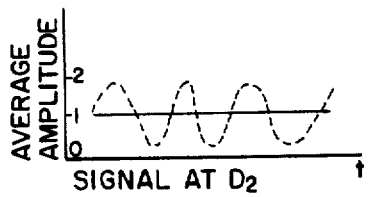
Figure 7B:
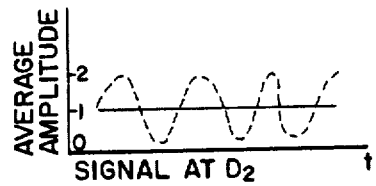

To understand why the selection of a particular component of the tracking signals results in a tracking system which can be used for both positive and negative polarity record carriers, reference is made to FIGS. 3a, 4a, 6a, 6b, 7a and 7b. For the tracking condition shown in FIG. 3a, the tracking signal produced by the detector 36′ is comprised of only a dc component or a low frequency component, because the tracking spot 16 lies between adjacent record tracks 26. As a result, the average amplitude of the tracking signal at point $D_1$ (FIG. 6a) in the circuit of FIG. 5 is of a relatively low value because the capacitor 50 and the bandpass filter 54 block passage of the dc and low frequency components. The tracking signal produced by the detector 38′, in contrast, contains mainly a high frequency component (indicated by the dotted lines in FIG. 6b) because the tracking spot 18 is centered on the record track 26. After amplification by an amplifier 60, the high frequency component passed by the bandpass filter 56 passes through an averaging circuit 59 (such as a rectifier) to produce a signal indicative of the average amplitude as shown in FIG. 6b. (An identical averaging circuit 59′ is included in the detector 36′ signal processing circuit for the same purpose.) For the off-track condition shown in FIG. 3a, therefore, the comparator circuit 62 compares a relatively low amplitude signal from detector 36′ with a relatively high amplitude signal from the detector 38′. (It will be noted that this is just the opposite of the signal processing of the tracking system shown in FIG. 1). The tracking error signal S thus produced causes the mirror 28 to be tilted in such a manner that the read spot 14 returns to its proper position centered on the track 26 (FIG. 2). In the case of a negative polarity disc as shown in FIG. 4a, the tracking signal produced by the detector 36′ again contains only a dc component, or a low frequency component, which components are blocked by the capacitor 50 and the bandpass filter 54. The average amplitude of the signal appearing at point $D_1$ of the circuit of FIG. 5 is thus relatively low; see FIG. 7a. The tracking signal produced by the detector 38′, on the other hand, contains mainly a high frequency component (indicated by the dotted lines in FIG. 7b) because the tracking spot 18 is centered on the record track 26. The average amplitude of the signal at point $D_2$ in the circuit of FIG. 5 is shown in FIG. 7b. A relatively low amplitude signal from the detector 36′, therefore, is compared with a relatively high amplitude signal from the detector 38′ to produce the tracking error signal S. The tracking error signal S so produced, importantly, has the same sign and approximately the same magnitude as the tracking error signal S which was produced for the positive polarity record carrier of FIG. 3a. The tracking system of the present invention, therefore, operates with record carriers of either polarity.

The present invention has been described in connection with a known tracking system (FIG. 1) to show how modifications to the signal processing circuit can be made, leaving the optical set-up unchanged, to produce a tracking system which functions with both positive and negative record carriers. It should be noted that there are various modifications which can also be made to the tracking system of the present invention. For example, when average amplitudes are compared, it is always necessary to determine some time frame over which the average amplitude will be computed. In typical video disc applications, frequencies on the order of 10 mhz are recorded and even a very small time frame over which the average amplitude of such a signal is computed would contain many cycles of the signal. It is generally desirable to average over several cycles so that an error signal is produced which does not attempt to make mirror tilt corrections faster than the response time of the mirror tilting system. Another modification concern the relative positions of the tracking spots 16, 18 as shown in FIG. 2. It is not necessary that the tracking spots 16, 18 each partially overlap the record track as shown in FIG. 2. In general, the tracking spots 16, 18 need only be nominally disposed toward opposite sides of the record track 26. Such a position of the tracking spots 16, 18 will, of course, change under actual playback conditions as off-track conditions occur. As an upper limit, the tracking spots will usually be spaced from respective sides of the record track by a distance not exceeding the width of the read spot, thereby ensuring tracking correction before the read spot entirely leaves the record track. For those applications wherein tracking is critical, the tracking spots are preferably spaced apart, in the cross-track direction, by a distance approximately equal to or less than the width of the record track. Such spacing ensures that any slight off-track movement will cause at least one of the tracking spots 16, 18 to partially overlap the record track 26. Such overlap produces a high frequency component in the respective tracking signal which, as explained above, produces a tracking correction.

The invention has been described in detail with particular reference to preferred embodiments thereof, but it will be understood that variations and modifications can be effected within the spirit and scope of the invention.

What is claimed is:

1. Apparatus for use in maintaining proper tracking of a record track on a record carrier, said record track having an information signal recorded thereon in the form of optical structure, said apparatus comprising:

a source of radiation for producing a pair of tracking spots impinging on said record carrier and nominally disposed toward opposite sides of said record track;

means for detecting each of said tracking spots after they interact with said record carrier, and for producing respective tracking signals indicative of such interaction;

means for isolating respective alternating signal components from each of said tracking signals, said signal components corresponding to the recorded information signal or a portion thereof; and means for comparing said respective signal components and for producing a tracking error signal based upon such comparison, said signal component comparing means being comprised of means for determining the average amplitudes of said isolated signal components, and means for comparing said average amplitudes and for producing a tracking error signal based upon such comparison.

2. Apparatus as claimed in claim 1, wherein said apparatus includes means for nominally spacing said tracking spots such that each of said tracking spots partially overlaps said record track.

3. Apparatus for use in maintaining proper tracking of a read spot on a record track recorded on a record carrier, said record track containing an information signal in the form of optical structure, said apparatus comprising:

means for producing a read spot focussed on said record carrier and nominally disposed to interact with said record track;

means for producing a pair of tracking spots focussed on said record carrier in fixed relation to said read spot and nominally disposed toward opposite sides of said record track, said tracking spots being spaced from respective sides of said record track by a distance not exceeding the width of said read spot;

a radiation detector for detecting each of said tracking spots after interaction with said record carrier and for producing respective tracking signals indicative of such interaction;

means for isolating similar alternating signal components from each of said tracking signals, said signal components corresponding to the recorded information signal or a portion thereof;

a signal comparator for comparing said similar signal components and for producing a tracking error signal based upon such comparison, said signal comparator being comprised of means for determining the average amplitudes of said similar signal components, and means for comparing said average amplitudes and for producing a tracking error signal based upon such comparison; and means for adjusting the position of said read spot relative to said record track in response to said tracking error signal.

4. Apparatus as claimed in claim 3 wherein said apparatus includes means for nominally spacing said tracking spots such that each of said tracking spots partially overlaps said record track.

* * * * *